United States Patent
Kanada

(10) Patent No.: US 10,968,804 B2
(45) Date of Patent: Apr. 6, 2021

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventor: Yuichiro Kanada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 16/539,063

(22) Filed: Aug. 13, 2019

(65) Prior Publication Data

US 2020/0072111 A1    Mar. 5, 2020

(30) Foreign Application Priority Data

Aug. 29, 2018  (JP) .............................. JP2018-160280

(51) Int. Cl.
| | |
|---|---|
| *F01N 9/00* | (2006.01) |
| *F01N 3/035* | (2006.01) |
| *F01N 11/00* | (2006.01) |
| *F01N 13/08* | (2010.01) |

(52) U.S. Cl.
CPC ............. *F01N 9/002* (2013.01); *F01N 3/035* (2013.01); *F01N 11/002* (2013.01); *F01N 13/085* (2013.01); *F01N 2430/06* (2013.01)

(58) Field of Classification Search
CPC ........ F01N 9/002; F01N 3/035; F01N 11/002; F01N 13/085; F01N 2430/06
USPC ......................................................... 60/276
See application file for complete search history.

(56) References Cited

U.S. PATENT DOCUMENTS

| | | | | |
|---|---|---|---|---|
| 3,207,704 A | * | 9/1965 | Stephens .................. | B01J 23/34 423/213.2 |
| 3,554,801 A | * | 1/1971 | Kleiman .................. | C11D 1/00 134/3 |
| 3,556,846 A | * | 1/1971 | Hnizda ..................... | C23G 1/02 134/3 |
| 3,682,702 A | * | 8/1972 | Hnizda ..................... | C23G 1/02 134/41 |
| 4,946,609 A | | 8/1990 | Pruess et al. | |

(Continued)

FOREIGN PATENT DOCUMENTS

| | | |
|---|---|---|
| DE | 3809307 A1 | 9/1989 |
| DE | 102009058698 A1 | 6/2011 |

(Continued)

*Primary Examiner* — Thai Ba Trieu
(74) *Attorney, Agent, or Firm* — Oliff PLC

(57) ABSTRACT

A controller calculates a predicted value of the exhaust pressure between a catalyst and a filter for a case in which engine fuel containing no manganese is used continuously. Also, the controller calculates a correlation value proportional to the amount of heat received by the catalyst when the catalyst temperature is higher than or equal to the adhesion temperature of manganese oxide. Further, the controller determines that there is a removal requirement for removing manganese oxide from the catalyst when the difference between the predicted value and the detected pressure of the exhaust pressure between the catalyst and the filter is greater than a specified determination value, and the correlation value is greater than or equal to a specified determination value. The controller executes the removal process by performing fuel amount increase control when it is determined that there is a removal requirement.

8 Claims, 7 Drawing Sheets

(56) References Cited

U.S. PATENT DOCUMENTS

| | | | | |
|---|---|---|---|---|
| 6,666,020 B2* | 12/2003 | Tonetti | ............... | F02D 41/1448 |
| | | | | 60/286 |
| 6,698,192 B2* | 3/2004 | Ootake | .................. | F01N 9/002 |
| | | | | 60/285 |
| 7,013,638 B2* | 3/2006 | Hiranuma | .......... | F01N 13/0097 |
| | | | | 60/286 |
| 8,250,857 B2* | 8/2012 | Driscoll | ................. | F01N 3/208 |
| | | | | 60/286 |
| 8,443,592 B2* | 5/2013 | Asanuma | ............... | F01N 3/085 |
| | | | | 60/276 |
| 8,959,894 B2* | 2/2015 | Qi | ........................ | F01N 13/009 |
| | | | | 60/286 |
| 9,777,654 B2* | 10/2017 | Qi | ........................ | F01N 11/002 |
| 2012/0137677 A1 | 6/2012 | Sato | | |
| 2013/0192202 A1 | 8/2013 | Lambert et al. | | |

FOREIGN PATENT DOCUMENTS

| | | | | |
|---|---|---|---|---|
| DE | 102013201011 A1 | | 8/2013 | |
| FR | 3014946 A1 * | | 6/2015 | ............ F01N 3/035 |
| JP | 2014-092045 A | | 5/2014 | |
| JP | 2014-148943 A | | 8/2014 | |
| JP | 2017-089433 A | | 5/2017 | |
| JP | 2017172407 A * | | 9/2017 | |
| JP | 2019167890 A * | | 10/2019 | |
| WO | 2012/042609 A1 | | 4/2012 | |

* cited by examiner

CONTROLLER AND CONTROL METHOD FOR INTERNAL COMBUSTION ENGINE

BACKGROUND

1. Field

The present disclosure relates to a controller and a control method for an internal combustion engine.

2. Description of Related Art

An additive may be mixed in engine fuel. In such a case, if the engine fuel contains manganese derived from the additive, manganese oxide may adhere to the exhaust gas purifying catalyst, and clogging may occur.

For example, in the internal combustion engine described in Japanese Laid-Open Patent Publication No. 2014-148943, if the estimated pressure loss of the catalyst exceeds a determination value, fuel injection amount is increased to cause the air-fuel ratio of the air-fuel mixture to become richer than the stoichiometric air-fuel ratio, thereby reducing and removing manganese oxide.

Some exhaust passages now incorporate a filter for trapping particulate matter in a section upstream of the catalyst. In an internal combustion engine having such an exhaust system, the pressure loss of the catalyst changes in accordance with the amount of deposit in the filter. The conventional determination of clogging based on the pressure loss of the catalyst pressure loss has a low determination accuracy. It is therefore difficult to execute a removal process at an appropriate time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine includes a fuel injection valve that supplies fuel into a cylinder, an exhaust gas purifying catalyst provided in an exhaust passage, a filter for trapping particulate matter in exhaust gas, a pressure sensor, and a controller. The filter being is provided in a section of the exhaust passage on a downstream side of the catalyst. The pressure sensor measures an exhaust pressure between the catalyst and the filter. The controller performs a fuel amount increase control to increase an amount of fuel injected from the fuel injection valve such that an air-fuel ratio of an air-fuel mixture becomes richer than a stoichiometric air-fuel ratio. The controller is configured to execute: a predicted value calculating process of calculating a predicted value of the exhaust pressure for a case in which engine fuel containing no manganese is used continuously; a correlation value calculating process of defining, as an adhesion temperature, a minimum temperature of the catalyst at which manganese oxide collected on the catalyst adheres to the catalyst, and calculating a correlation value that is proportional to an amount of heat received by the catalyst when a temperature of the catalyst is higher than or equal to the adhesion temperature; a removal requirement determining process of determining that there is a removal requirement for removing manganese oxide from the catalyst when a difference between a detected pressure of the pressure sensor and the predicted value is greater than a specified determination value, and the correlation value is greater than or equal to a specified determination value; and a removal process of performing the fuel amount increase control when it is determined that there is the removal requirement.

In another general aspect, a controller for an internal combustion engine is provided. The internal combustion engine includes a fuel injection valve that supplies fuel into a cylinder, an exhaust gas purifying catalyst provided in an exhaust passage, a filter for trapping particulate matter in exhaust gas, a pressure sensor, and a controller. The filter is provided in a section of the exhaust passage on a downstream side of the catalyst. The pressure sensor measures an exhaust pressure between the catalyst and the filter. The controller performs a fuel amount increase control to increase an amount of fuel injected from the fuel injection valve such that an air-fuel ratio of an air-fuel mixture becomes richer than a stoichiometric air-fuel ratio. The controller includes circuitry that is configured to execute: a predicted value calculating process of calculating a predicted value of the exhaust pressure for a case in which engine fuel containing no manganese is used continuously; a correlation value calculating process of defining, as an adhesion temperature, a minimum temperature of the catalyst at which manganese oxide collected on the catalyst adheres to the catalyst, and calculating a correlation value that is proportional to an amount of heat received by the catalyst when a temperature of the catalyst is higher than or equal to the adhesion temperature; a removal requirement determining process of determining that there is a removal requirement for removing manganese oxide from the catalyst when a difference between a detected pressure of the pressure sensor and the predicted value is greater than a specified determination value, and the correlation value is greater than or equal to a specified determination value; and a removal process of performing the fuel amount increase control when it is determined that there is the removal requirement.

In another general aspect, a control method for an internal combustion engine is provided. The internal combustion engine includes a fuel injection valve that supplies fuel into a cylinder, an exhaust gas purifying catalyst provided in an exhaust passage, a filter for trapping particulate matter in exhaust gas, and a pressure sensor. The filter is provided in a section of the exhaust passage on a downstream side of the catalyst. The pressure sensor measures an exhaust pressure between the catalyst and the filter. The internal combustion engine is controlled to perform a fuel amount increase control to increase an amount of fuel injected from the fuel injection valve such that an air-fuel ratio of an air-fuel mixture becomes richer than a stoichiometric air-fuel ratio. The control method includes: calculating a predicted value of the exhaust pressure for a case in which engine fuel containing no manganese is used continuously; defining, as an adhesion temperature, a minimum temperature of the catalyst at which manganese oxide collected on the catalyst adheres to the catalyst, and calculating a correlation value that is proportional to an amount of heat received by the catalyst when a temperature of the catalyst is higher than or equal to the adhesion temperature; determining that there is a removal requirement for removing manganese oxide from the catalyst when a difference between a detected pressure of the pressure sensor and the predicted value is greater than a specified determination value, and the correlation value is greater than or equal to a specified determination value; and performing the fuel amount increase control when it is determined that there is the removal requirement.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

DETAILED DESCRIPTION

First Embodiment

A controller 100 for an internal combustion engine 10 according to a first embodiment will now be described with reference to FIGS. 1 to 8. The engine 10 is mounted on a vehicle.

Figure 1:
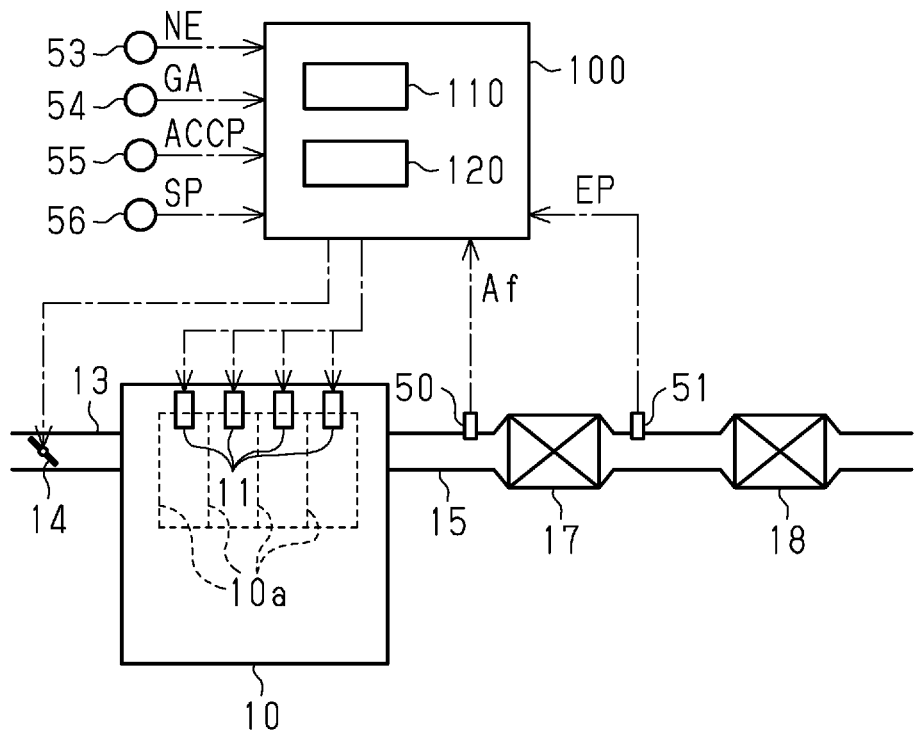
FIG. 1 is a schematic diagram showing the structure of a controller for an internal combustion engine according to a first embodiment.

As shown in FIG. 1, the internal combustion engine 10 includes cylinders 10a. The intake port of each cylinder 10a is connected to an intake passage 13. A throttle valve 14, which regulates the intake air amount, is provided in the intake passage 13.

The internal combustion engine 10 is equipped with fuel injection valves 11 that supply fuel into the cylinders 10a. The fuel injection valve 11 is a port injection type that supplies fuel into the cylinder 10a by injecting fuel into the intake port. The fuel injection valve 11 may be a direct injection type that directly injects and supplies fuel into the cylinder 10a. In the combustion chamber of each cylinder 10a, mixture of air introduced through the intake passage 13 and fuel injected from the fuel injection valve 11 is burned by spark discharge. Exhaust gas generated by the combustion of the air-fuel mixture is discharged to an exhaust passage 15 connected to the exhaust port of the internal combustion engine 10.

An exhaust gas purifying three-way catalyst (hereinafter, simply referred to as catalyst) 17 is provided in the exhaust passage 15. The catalyst 17 oxidizes hydrocarbon (HC) and carbon monoxide (CO) contained in the exhaust gas to purify the exhaust gas. The catalyst 17 also reduces nitrogen oxide (NOx) contained in the exhaust gas to purify the exhaust gas.

A filter 18 for trapping particulate matter (hereinafter, referred to as PM) in the exhaust gas is provided in a section of the exhaust passage 15 on the downstream side of the catalyst 17. The controller 100 of the internal combustion engine 10 includes a central processing unit (hereinafter, referred to as a CPU) 110 and a memory 120. Various control processes are executed by the CPU 110 performing programs stored in the memory 120.

The controller 100 receives detection signals from the various types of sensors. The sensors include an air-fuel ratio sensor 50. The air-fuel ratio sensor 50 is arranged in a section of the exhaust passage 15 on the upstream side of the catalyst 17. The air-fuel ratio sensor 50 detects the oxygen concentration of gas flowing in the exhaust passage 15, that is, the air-fuel ratio Af of air-fuel mixture. A pressure sensor 51 that measures the exhaust pressure EP is provided in a section of the exhaust passage 15 between the catalyst 17 and the filter 18. The exhaust pressure EP detected by the pressure sensor 51 is the differential pressure between the atmospheric pressure and the exhaust pressure between the catalyst 17 and the filter 18. The differential pressure is used as a value indicating the pressure difference between the exhaust pressure on the upstream side of the filter 18 and the exhaust pressure on the downstream side of the filter 18. A crank angle sensor 53, which detects the crank angle, is provided in the vicinity of the crankshaft of the internal combustion engine 10. An air flowmeter 54, which detects the intake air amount GA, is provided in a section of the intake passage 13 on the upstream side of the throttle valve 14. The vehicle also includes an accelerator position sensor 55 and a vehicle speed sensor 56. The accelerator position sensor 55 detects an accelerator operation amount ACCP, which is the operation amount of the accelerator pedal. The vehicle speed sensor 56 detects the vehicle speed SP, which is the traveling speed of the vehicle.

The controller 100 calculates the engine rotational speed NE from the detection result of the crank angle by the crank angle sensor 53. Further, the controller 100 calculates the total travel distance of the vehicle, that is, the integrated value of the travel distance since the vehicle was manufactured, based on the vehicle speed SP. The controller 100 calculates a catalyst temperature Tsc, which is the temperature of the catalyst 17, and a filter temperature TfL, which is the temperature of the filter 18, based on various parameters of the engine operating state such as the intake charging efficiency and the engine rotational speed NE.

The controller 100 calculates an air-fuel ratio correction value FAF, such that the difference between the air-fuel ratio Af, which is the detection value of the air-fuel ratio sensor 50, and a target air-fuel ratio Aft decreases. Using the air-fuel ratio correction value FAF, the controller 100 performs a known feedback control to correct the fuel injection amount of the fuel injection valve 11. In the present embodiment, the target air-fuel ratio Aft is set to the stoichiometric air-fuel ratio.

The controller 100 performs a fuel amount increase control to increase the amount of fuel injected from the fuel injection valve 11 such that the air-fuel ratio of the air-fuel mixture becomes richer than the stoichiometric air-fuel ratio. Since this type of fuel amount increase control is known in the art, detailed description thereof will be omitted. The fuel amount increase control is basically the control described below.

First, while the fuel amount increase control is being performed, the execution of the air-fuel ratio feedback control is suspended. The controller 100 then calculates a basic injection amount Qb, which is required to cause the air-fuel ratio Af to be the stoichiometric air-fuel ratio, based on factors such as the intake air amount GA and the engine rotational speed NE. Also, in accordance with the catalyst temperature Tsc and the degree of acceleration requirement, the controller 100 calculates a fuel amount increase value Qad for increasing the fuel injection amount such that the air-fuel ratio of the air-fuel mixture becomes richer than the stoichiometric air-fuel ratio. Then, the controller 100 increases the fuel injection amount by setting a target fuel injection amount Qt to a value obtained by adding the fuel amount increase value Qad to the basic injection amount Qb. That is, the controller 100 performs the fuel amount increase control by controlling the fuel injection valve 11 such that an amount of fuel corresponding to the target fuel injection amount Qt is injected from the fuel injection valve 11.

In the present embodiment, the fuel amount increase control is performed as an overtemperature protection control (so-called OT increase control) for suppressing overheat of the catalyst 17, which is likely to occur when the engine load is high. In the overtemperature protection control, when the catalyst temperature Tsc becomes higher than or equal to a specified start temperature, it is determined that the execution condition of the overtemperature protection control is met, and the fuel amount increase control is started. Then, when the catalyst temperature Tsc becomes lower than or equal to a specified stop temperature, the fuel amount increase control is ended.

In addition, the fuel amount increase control is performed as an acceleration fuel amount increase control for increasing the engine power when the vehicle is accelerated. In the acceleration fuel amount increase control, when an acceleration requirement of the vehicle is detected based on the accelerator operation amount ACCP or the like, it is determined that the execution condition of the acceleration fuel amount increase control is met, and the fuel amount increase control is started. When a predetermined time has elapsed from the start of the fuel amount increase control, the fuel amount increase control is ended.

Further, even when clogging due to adhesion of manganese oxide may have occurred in the catalyst 17, the controller 100 performs the fuel amount increase control as a removal process of removing the manganese oxide adhered to the catalyst 17.

Next, a procedure for executing the removal process at an appropriate time by properly determining whether there is a high possibility that the catalyst 17 is clogged in the internal combustion engine 10, which has the exhaust system described above, will be described.

The present inventors have discovered that, when the catalyst temperature Tsc becomes higher than or equal to a specific temperature, oxidation of the manganese oxide collected on the catalyst 17 proceeds, so that the manganese oxide changes from powder to deposit and the adhesion proceeds.

The minimum temperature of the catalyst 17 at which collected manganese oxide adheres to the catalyst 17 is defined as an adhesion temperature Tf (for example, about 850° C.). With a precondition that the engine fuel contains manganese, when a heat reception condition is met in which the amount of heat received by the catalyst 17 when the catalyst temperature Tsc is higher than or equal to the adhesion temperature Tf is increased to a some extent, the possibility of clogging of the catalyst 17 increases if the adhesion amount of manganese oxide is great.

Figure 2:
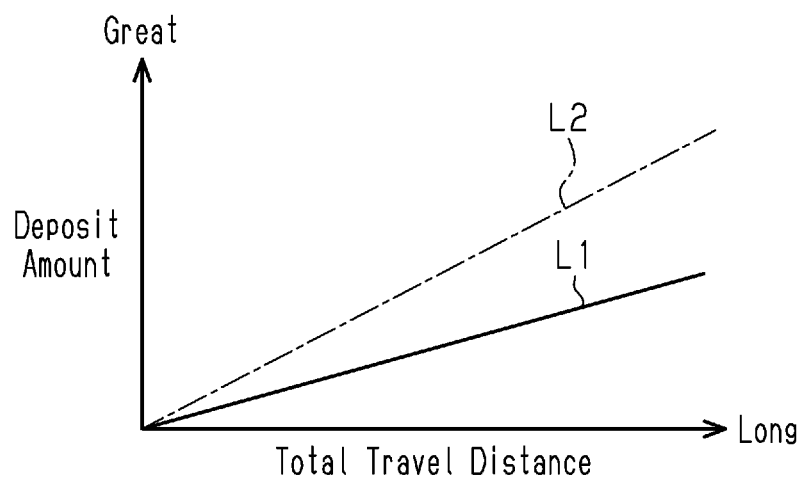
FIG. 2 is a graph showing the relationship between the total travel distance of the vehicle equipped with the internal combustion engine and the amount of deposit in the filter.

FIG. 2 shows the relationship between the total travel distance of the vehicle equipped with the internal combustion engine 10 and the amount of deposit in the filter 18. The solid line L1 in FIG. 2 indicates change in the amount of deposit in a vehicle that continuously uses engine fuel containing no manganese, and the long dashed short dashed line L2 in FIG. 2 indicates change in the amount of deposit in a vehicle that uses engine fuel containing manganese.

As shown in FIG. 2, in a vehicle that uses engine fuel containing no manganese, as the total travel distance increases, the ash content (unburned component of the trapped PM) deposited on the filter 18 increases. That is, the amount of deposit on the filter 18 increases. In contrast, in a vehicle that uses engine fuel containing manganese, not only the ash content, but also manganese oxide that has passed through the catalyst 17 is deposited on the filter 18. Therefore, even if the total travel distances are the same, the amount of deposit in the filter 18 is greater in the vehicle that uses engine fuel containing manganese (long dashed short dashed line L2) than in the vehicle that uses engine fuel containing no manganese (solid line L1).

Figure 3:
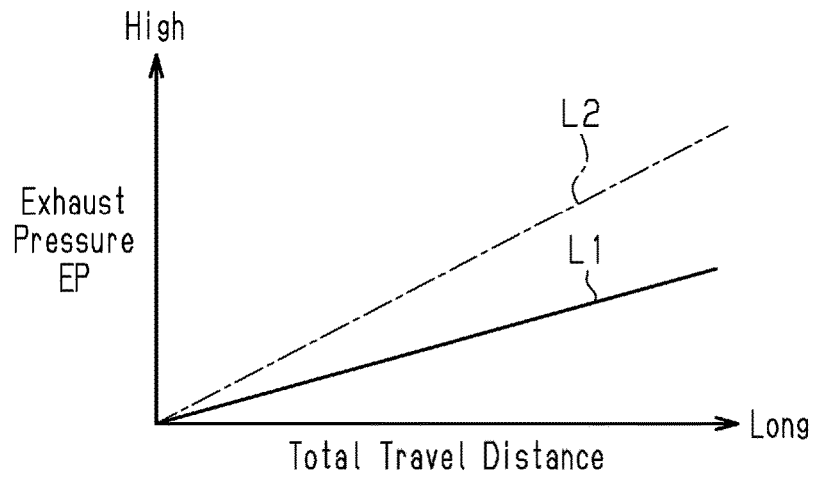
FIG. 3 is a graph showing the relationship between the total travel distance of the vehicle and the exhaust pressure on the upstream side of the filter.

FIG. 3 shows the relationship between the total travel distance of the vehicle equipped with the internal combustion engine 10 and the exhaust pressure EP. The solid line L1 in FIG. 3 indicates change in the exhaust pressure EP in a vehicle that continuously uses engine fuel containing no manganese. The long dashed short dashed line L2 in FIG. 3 indicates change in the exhaust pressure EP in a vehicle that uses engine fuel containing manganese.

As described above, when engine fuel containing no manganese is used, manganese oxide is not deposited on the filter 18, so that the pressure loss of the filter 18 tends to be small as compared to a case in which engine fuel containing manganese is used. Therefore, even if the total travel distances are the same, the exhaust pressure EP between the catalyst 17 and the filter 18 tends to be lower in the vehicle that uses engine fuel containing no manganese (solid line L1) than in the vehicle that uses engine fuel containing manganese (long dashed short dashed line L2).

The CPU 110 calculates a predicted value BP of the exhaust pressure EP for a case in which engine fuel containing no manganese is used continuously. When the difference between the exhaust pressure EP, which is detected by the pressure sensor 51, and the calculated predicted value BP is greater than a specified determination value A, it is determined that the engine fuel contains manganese. It is thus considered that the precondition is met.

Further, the CPU 110 calculates a correlation value proportional to the amount of heat received by the catalyst 17 when the catalyst temperature Tsc is higher than or equal to the adhesion temperature Tf. If the correlation value is greater than or equal to a specified determination value B, it is considered that the heat reception condition is also met.

In the first embodiment, the CPU 110 executes a process of calculating a correlation value of the predicted value BP of the exhaust pressure EP and the amount of heat received by the catalyst 17. When the difference between the exhaust pressure EP, which is detected by the pressure sensor 51, and the predicted value BP is greater than the specified determination value A, and the correlation value is greater than or equal to the specified determination value B, the CPU 110 determines that, since the catalyst 17 is likely to be clogged, there is a removal requirement for removing the manganese oxide from the catalyst 17. The CPU 110 then performs the removal process to remove manganese oxide from the catalyst 17 by performing the fuel amount increase control.

In the first embodiment, the controller 100 calculates a correlation value proportional to the amount of heat received by the catalyst 17 when the catalyst temperature Tsc is higher than or equal to the adhesion temperature Tf. Specifically, the controller 100 obtains the catalyst temperature Tsc at predetermined intervals and calculates, as the correlation value, an accumulated temperature THs obtained by integrating values of the catalyst temperature Tsc that are higher than or equal to the adhesion temperature Tf.

Figure 4:
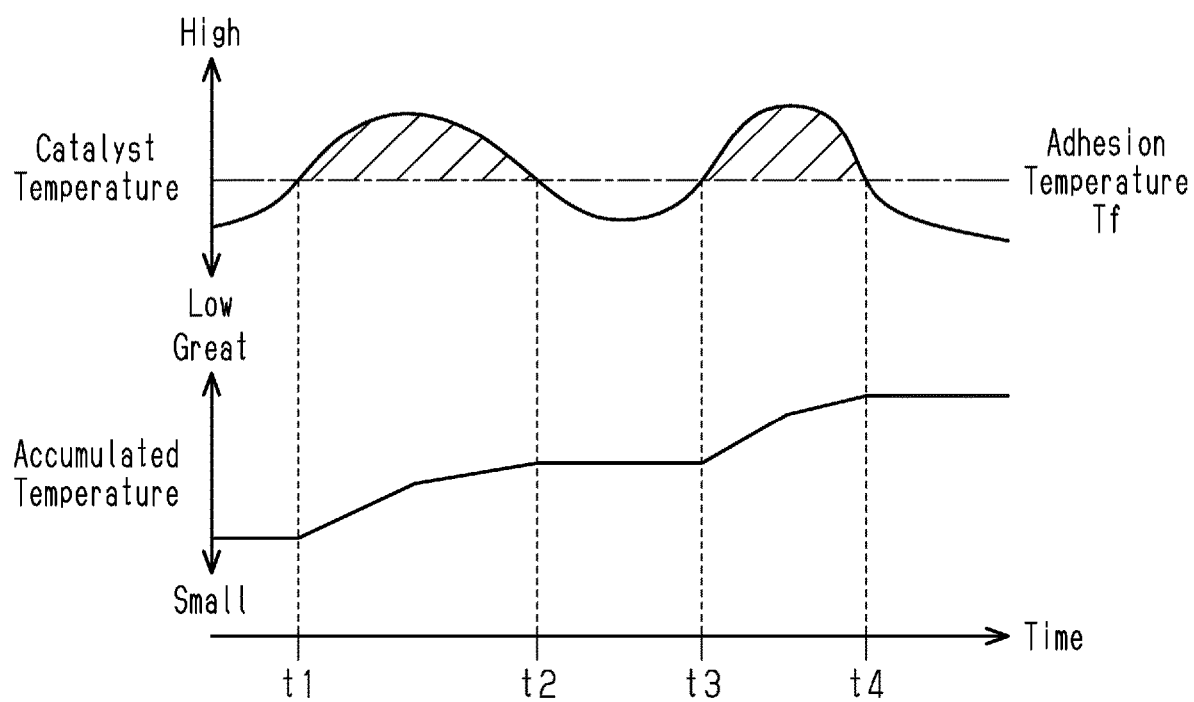
FIG. 4 is a timing diagram showing changes in the temperature of the catalyst and the accumulated temperature.

As shown in FIG. 4, during each of the periods in which the catalyst temperature Tsc is higher than or equal to the adhesion temperature Tf (a period from a point in time t1 to a point in time t2, a period from a point in time t3 to a point time t4), the value of the accumulated temperature THs increases. In contrast, during each of periods in which the catalyst temperature Tsc is lower than the adhesion temperature Tf (a period before the point in time t1, a period from the point in time t2 to the point in time t3, a period after the point in time t4), the value of the accumulated temperature THs is maintained without being changed. The accumulated temperature THs is reset to 0 when a determination condition, which will be discussed below, is met.

Figure 5:
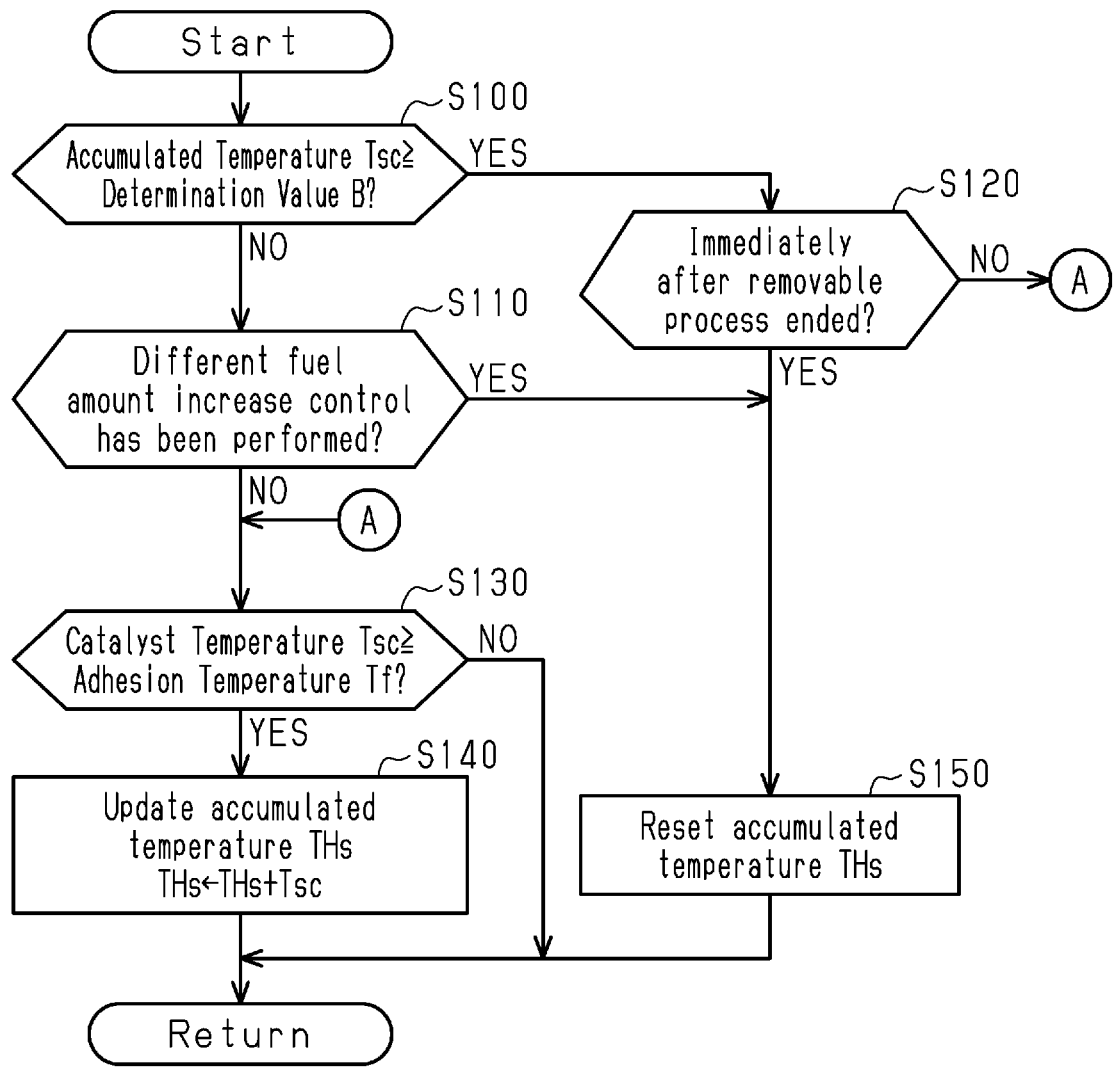
FIG. 5 is a flowchart showing the procedure of an accumulated temperature calculating process.

FIG. 5 shows the procedure of a process of calculating the accumulated temperature THs. The series of processes shown in FIG. 5 is implemented by the CPU 110 repeatedly executing programs stored in the memory 120 at predetermined intervals during the engine operation. In the following description, the number of each step is represented by the letter S followed by a numeral. The process of calculating the accumulated temperature THs corresponds to a correlation value calculating process of calculating a correlation value.

When this process is started, the CPU 110 first determines whether the current accumulated temperature THs is higher than or equal to the determination value B (S100). The determination value B is used to determine whether the accumulated temperature THs satisfies the heat reception condition and is set in advance.

If it is determined that the accumulated temperature THs is greater than or equal to the determination value B (S100: YES), the CPU 110 determines whether the removal process described above (S120) has just ended. If it is determined that it is immediately after the removal process has ended (S120: YES), the CPU 110 resets the accumulated temperature THs to 0 (S150), and temporarily ends this process.

If it is determined that it is not immediately after the removal process has ended (S120: NO), the CPU 110 executes the process after S130. If it is determined that the accumulated temperature THs is lower than the determination value B (S100: NO), the CPU 110 determines whether another fuel amount increase control, that is, a fuel amount increase control based on a requirement different from the removal requirement of the manganese oxide has been performed (S110). In S110, it is determined that a different fuel amount increase control has been performed if the above-described overtemperature protection control or the acceleration fuel increase is performed. If an affirmative determination is made in S110 (S110: YES), the CPU 110 resets the accumulated temperature THs to 0 (S150) and temporarily ends this process.

When it is determined that a different fuel amount increase control has not been performed (S110: NO), the CPU 110 determines whether the current catalyst temperature Tsc is higher than or equal to the adhesion temperature Tf (S130). When it is determined that the current catalyst temperature Tsc is higher than or equal to the adhesion temperature Tf (S130: YES), the CPU 110 adds the current catalyst temperature Tsc to the current accumulated temperature THs to update the accumulated temperature THs (S140) and temporarily ends this process.

When it is determined that the current catalyst temperature Tsc is lower than the adhesion temperature Tf (S130: NO), the CPU 110 temporarily ends this process to maintain the current value of the accumulated temperature THs without updating the value.

Figure 6:
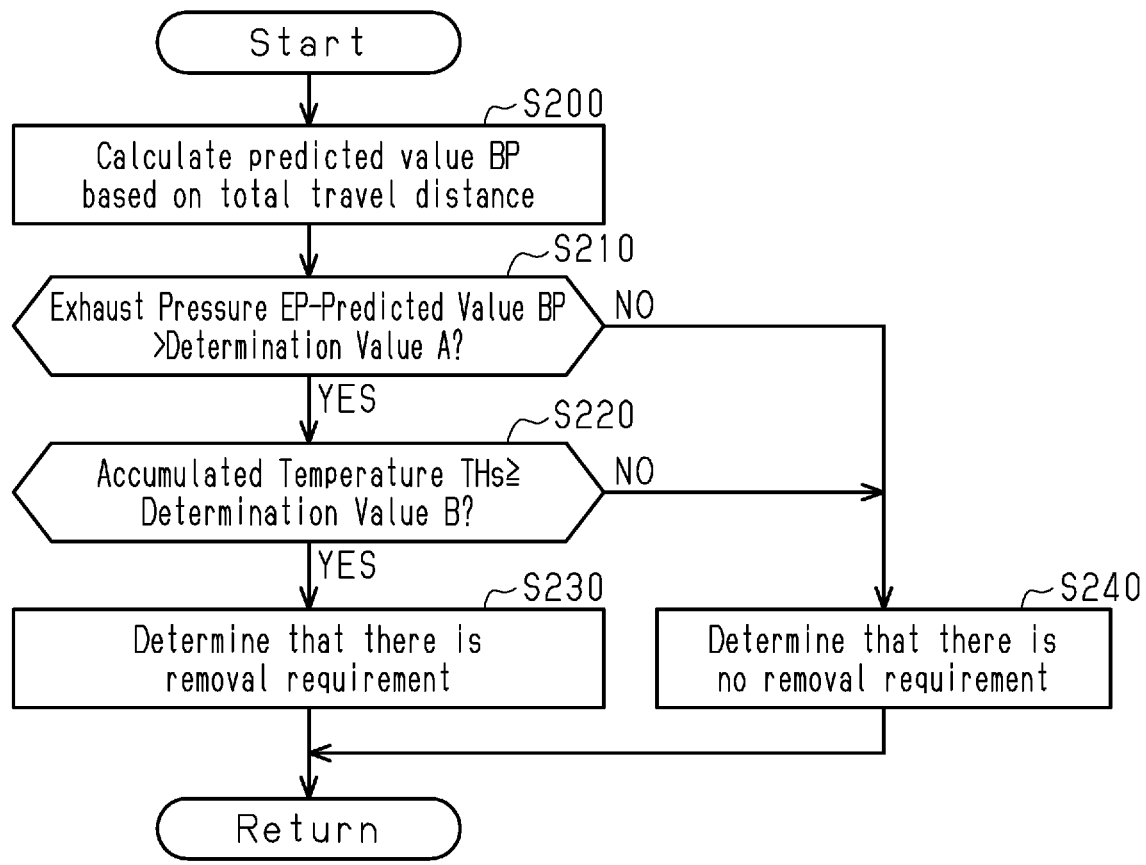
FIG. 6 is a flowchart showing a procedure of a removal requirement determining process.

FIG. 6 shows a procedure of a removal requirement determining process of determining whether there is the above-described removal requirement. The series of processes shown in FIG. 6 is implemented by the CPU 110 repeatedly executing programs stored in the memory 120 of the controller 100 at predetermined intervals during the engine operation.

When this process is started, the CPU 110 calculates the predicted value BP based on the total travel distance of the vehicle (S200). As described above, in a vehicle that continuously uses engine fuel containing no manganese, the exhaust pressure EP gradually increases as the total travel distance increases. In the first embodiment, the relationship between the total travel distance of a vehicle that continuously uses engine fuel containing no manganese and the exhaust pressure EP is defined in advance. From the relationship between the total travel distance of the vehicle and the exhaust pressure EP, the CPU 110 calculates the predicted value BP based on the total travel distance. In the present embodiment, the predicted value BP is calculated such that the predicted value BP becomes a higher pressure value as the total travel distance increases. The process of S200 corresponds to a predicted value calculating process of calculating a predicted value of the exhaust pressure for a case in which engine fuel containing no manganese is used continuously.

Next, the CPU 110 determines whether the value obtained by subtracting the predicted value BP from the current exhaust pressure EP is greater than the determination value A (S210). The determination value A is set in advance such that it is appropriately determined that the engine fuel contains manganese, that is, the precondition is met, based on the fact that the value obtained by subtracting the predicted value BP from the exhaust pressure EP is greater than the determination value A.

If it is determined that the value obtained by subtracting the predicted value BP from the current exhaust pressure EP is greater than the determination value A (S210: YES), the CPU 110 determines whether the current accumulated temperature THs is greater than or equal to the determination value B (S220). If it is determined that the current accumulated temperature THs is greater than or equal to the determination value B (S220: YES), the CPU 110 determines that there is a removal requirement (S230) and temporarily ends this process.

If it is determined that the value obtained by subtracting the predicted value BP from the current exhaust pressure EP is less than or equal to the determination value A (S210: NO) or if the current accumulated temperature THs is less than the determination value B (S220: NO), the CPU 110 determines that there is no removal requirement (S240) and temporarily ends this process.

Figure 7:
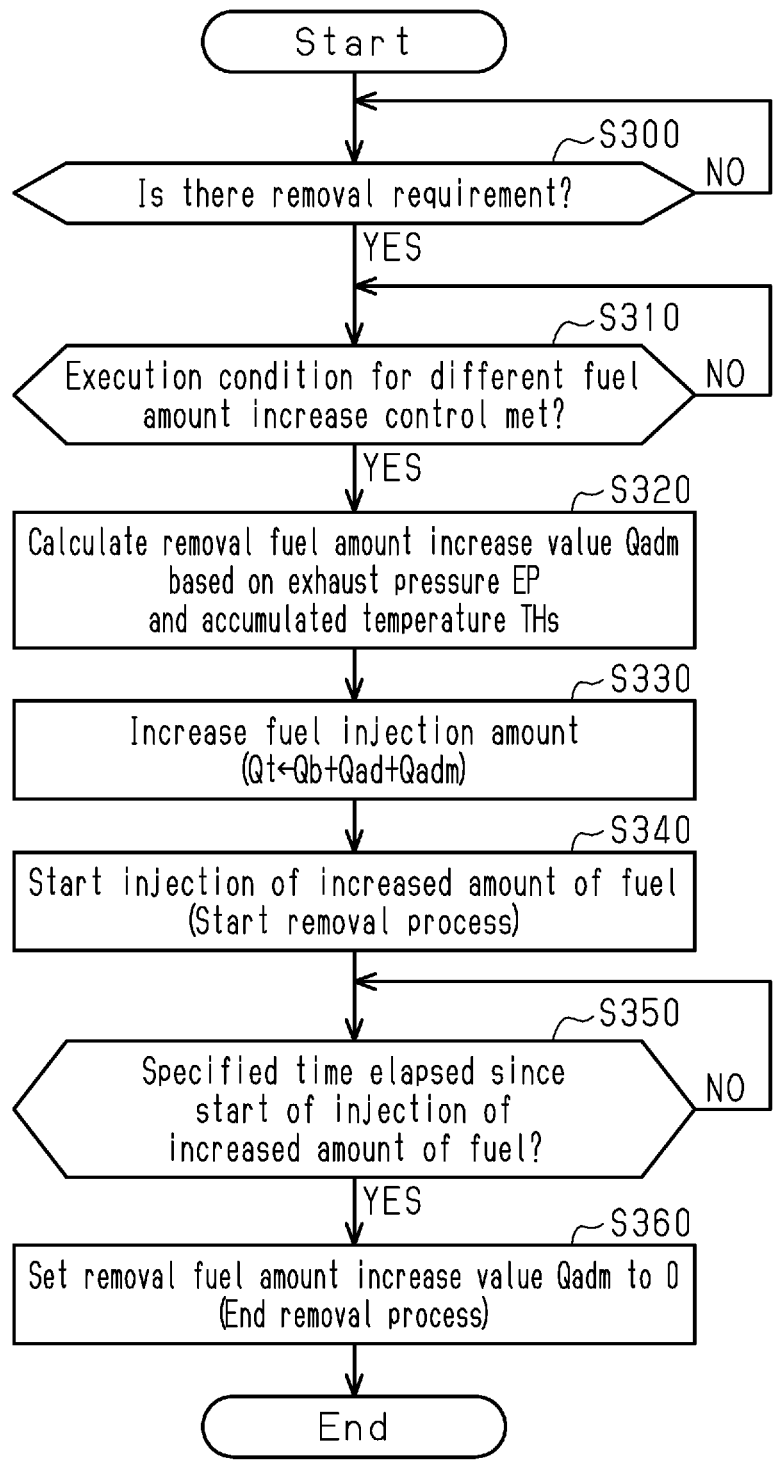
FIG. 7 is a flowchart showing a procedure of a removal process.

FIG. 7 shows the procedure of a removal process of removing manganese oxide adhered to the catalyst 17. The series of processes shown in FIG. 7 is implemented by the CPU 110 executing programs stored in the memory 120 of the controller 100 during the engine operation.

When this process is started, the CPU 110 determines whether there is currently a removal requirement (S300). If it is determined that there is no removal requirement (S300: NO), the CPU 110 repeatedly executes the process of S300 until it is determined that there is a removal requirement.

If it is determined that there is a removal requirement (S300: YES), the CPU 110 determines whether the execution conditions are met for other fuel amount increase control, that is, the overtemperature protection control and the acceleration fuel amount increase control (S310). An affirmative determination is made in S310 when the execution condition for the overtemperature protection control is met or when the execution condition for the acceleration fuel amount increase control is met. If it is determined that the execution conditions for the other fuel amount increase control are not met (S310: NO), the CPU 110 repeats the process of S310 until it is determined that the execution conditions for the other fuel amount increase control are met.

If it is determined that the execution conditions for the other fuel amount increase control, that is, the overtemperature protection control and the acceleration fuel amount increase control are met (S310: YES), the CPU 110 calculates a removal fuel amount increase value Qadm, which is the increase amount of fuel required to remove manganese oxide from the catalyst 17, based on the current exhaust pressure EP and the accumulated temperature THs (S320).

Figure 8:
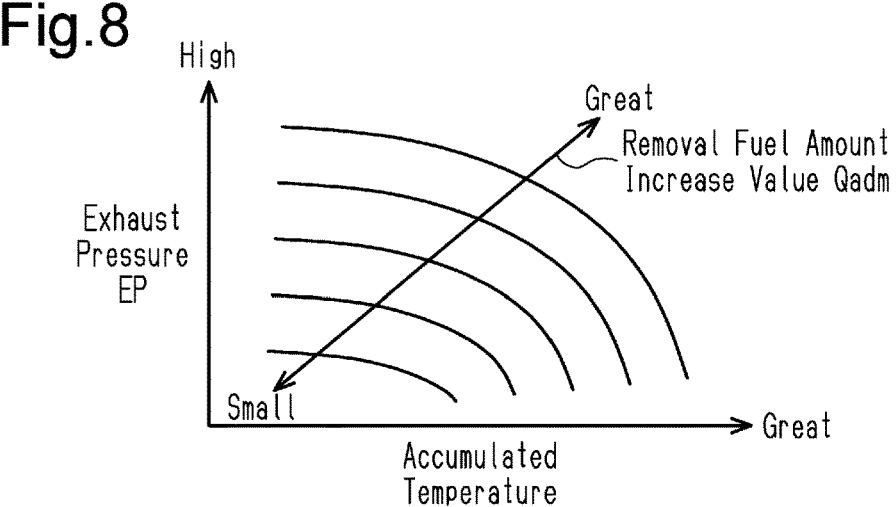
FIG. 8 is a conceptual diagram showing the relationship between the fuel amount increase value, the accumulated temperature, and the exhaust pressure.

As shown in FIG. 8, the removal fuel amount increase value Qadm is variably set so as to be increased as the accumulated temperature THs increases. This is because there is a high possibility that the amount of manganese oxide adhering to the catalyst 17 increases as the value of the accumulated temperature THs at the time of executing the removal process increases, so that the amount of fuel necessary for removing the manganese oxide increases.

The removal fuel amount increase value Qadm is variably set so as to be increased as the exhaust pressure EP increases. This is because there is a high possibility that the amount of manganese oxide deposited on the filter 18 increases as the exhaust pressure EP at the time of executing the removal process increases and there is thus a high possibility that the amount of manganese oxide adhering to the catalyst 17 increases, so that the amount of fuel necessary for removing the manganese oxide increases.

Then, the CPU 110 increases the fuel injection amount by setting the target fuel injection amount Qt to a value obtained by adding, to the basic injection amount Qb, the fuel amount increase value Qad required for executing other fuel amount increase control and the removal fuel amount increase value Qadm (S330).

The CPU 110 performs the fuel amount increase control by controlling the fuel injection valve 11 such that an amount of fuel corresponding to the target fuel injection amount Qt is injected, thereby starting injection of an increased amount of fuel (S340). The execution of the process of S340 starts the removal process through the execution of the fuel amount increase control, and other fuel amount increase control of which the execution condition is met is started. As described above, the increase of the amount of fuel by the execution of the removal process is performed together with the increase of the amount of fuel when performing the overtemperature protection control and the increase of the amount of fuel when performing the acceleration fuel amount increase control.

When the removal process is started, the catalyst 17 is exposed to a reducing atmosphere through the implementation of the fuel amount increase control. The manganese oxide adhering to the catalyst 17 is thus reduced and removed. Also, when fuel amount increase control is performed, the amount of vaporized fuel increases. The heat of vaporization lowers the exhaust temperature. Therefore, the catalyst temperature Tsc becomes lower than the adhesion temperature Tf, so that the re-adhesion of manganese oxide to the catalyst 17 will be limited.

Next, the CPU 110 determines whether a specified time has elapsed since the start of the injection of the increased amount of fuel (S350). The specified time is a fixed value and is set to the execution time of the removal process necessary for removing the manganese oxide adhering to the catalyst 17. If it is determined that the specified time has not elapsed (S350: NO), the CPU 110 repeatedly executes the process of S350 until it is determined that the specified time has elapsed.

If it is determined that the specified time has elapsed (S350: YES), the CPU 110 sets, to 0, the value of the removal fuel amount increase value Qadm among various increase values by which the fuel injection amount has been increased, and ends the removal process (S360). Then, the CPU 110 ends this process.

An operation and advantages of the first embodiment will now be described.

(1) The CPU 110 calculates the predicted value BP of the exhaust pressure EP and calculates the accumulated temperature THs, which is a correlation value proportional to the amount of heat received by the catalyst 17 when the catalyst temperature Tsc is higher than or equal to the adhesion temperature Tf. When the difference between the exhaust pressure EP, which is detected by the pressure sensor 51, and the predicted value BP is greater than the specified determination value A, and the accumulated temperature THs is greater than or equal to the specified determination value B, the CPU 110 determines that, since the catalyst 17 is likely to be clogged, there is a removal requirement for removing the manganese oxide from the catalyst 17. The CPU 110 then performs the removal process to remove manganese oxide from the catalyst 17 by performing the fuel amount increase control. Therefore, in the internal combustion engine 10, which is provided with the catalyst 17 and the filter 18 in the exhaust passage 15, it is possible to properly determine whether there is a high possibility of clogging of the catalyst 17. This allows the removal process to be executed at appropriate time.

(2) The CPU 110 calculates the predicted value BP based on the total travel distance of the vehicle such that the predicted value BP increases as the total travel distance increases. This allows the predicted value BP to be properly calculated in accordance with changes in the total travel distance.

(3) In the internal combustion engine 10, the fuel amount increase control may be executed based on a requirement different from the removal requirement. As the fuel amount increase control based on a different requirement, the first embodiment executes the overtemperature protection control for suppressing overheat of the catalyst 17, which is likely to occur when the engine load is high, and the acceleration fuel amount increase control for increasing the engine power at acceleration.

Even if manganese oxide adheres to the catalyst 17, the amount of adhered manganese oxide is small before the accumulated temperature THs reaches the determination value B. Thus, the manganese oxide adhered to the catalyst 17 is highly likely to be removed by executing the fuel amount increase control based on a different requirement. Accordingly, in the process of calculating the accumulated temperature THs shown in FIG. 5, the CPU 110 resets the accumulated temperature THs to zero when the fuel amount increase control is performed based on a requirement different from the removal requirement before the accumulated temperature THs reaches the determination value B (S100: NO).

That is, the accumulated temperature THs is reset to zero when it is highly likely that the manganese oxide adhered to the catalyst 17 has been removed by performing the fuel amount increase control based on a requirement different from the removal requirement. This extends the period until the accumulated temperature THs reaches the determination value B as compared to a case in which the accumulated temperature THs is not reset. As a result, the frequency of execution of the removal process is reduced. This limits deterioration of the fuel economy due to increase in the amount of fuel in the removal process.

(4) As shown in FIG. 8, the removal fuel amount increase value Qadm, which is the amount of fuel increase during the execution of the removal process, is variably set so as to be increased as the accumulated temperature THs at the execution of the removal process increases. This allows the amount of fuel during the execution of the removal process to be properly adjusted in accordance with the amount of manganese oxide adhering to the catalyst 17.

(5) As shown in FIG. 8, the removal fuel amount increase value Qadm, which is the amount of fuel increase during the execution of the removal process, is variably set so as to be increased as the exhaust pressure EP at the execution of the removal process increases. This allows the amount of fuel during the execution of the removal process to be properly adjusted in accordance with the amount of manganese oxide adhering to the catalyst 17.

(6) When the amount of fuel is increased by executing the removal process, the engine power is increased to some extent, so that torque shock is likely to occur. The temperature of the catalyst 17 is likely to increase when the engine load is high, so that the overtemperature protection control is performed more frequently. However, at this time, since the engine power has been increased, the torque shock due to the removal process is not noticeable even if the amount of fuel is increased by the removal process. In the first embodiment, the increase of the amount of fuel by the removal process is performed together with the increase of the amount of fuel when performing the overtemperature protection control. This allows the removal process to be executed while suppressing the torque shock.

(7) Likewise, during acceleration at which the acceleration fuel amount increase control is performed, the engine power is increased. Thus, the torque shock due to the removal process is not noticeable even if the amount of fuel is increased by the removal process. In the first embodiment, the increase of the amount of fuel by the removal process is performed together with the increase of the amount of fuel when performing the acceleration fuel amount increase control. This also allows the removal process to be executed while suppressing the torque shock.

(8) Since the removal process is executed at an appropriate time, clogging of the catalyst 17 is properly suppressed. Therefore, even if the catalyst 17 is miniaturized, clogging is unlikely to occur. This allows the catalyst 17 to be reduced in size and weight.

(9) Since clogging of the catalyst 17 can be properly suppressed, increase in the exhaust pressure on the upstream side of the catalyst 17 is limited. Therefore, it is possible to prevent unwanted events such as falling out of the catalyst due to increase in the exhaust pressure, abnormal valve closing of the exhaust valve, and drop of the engine power.

(10) If the warming performance of the catalyst 17 is improved by increasing the exhaust temperature at cold start, the catalyst temperature Tsc may become higher than or equal to the adhesion temperature Tf. This can promote clogging of the catalyst 17 due to adhesion of manganese oxide. In this respect, even if the catalyst temperature Tsc becomes higher than or equal to the adhesion temperature Tf, clogging of the catalyst 17 is properly suppressed in the first embodiment since the removal process is executed at an appropriate time. This allows the exhaust temperature to be further increased during cold start. This improves the warming performance of the catalyst 17.

Second Embodiment

A controller 100 for an internal combustion engine 10 according to a second embodiment will now be described with reference to FIG. 9.

In the first embodiment, the increase of the amount of fuel by the removal process is performed together with the increase of the amount of fuel when performing the fuel amount increase control based on a requirement different from the removal requirement.

The procedure of the second embodiment is different from that of the first embodiment in that increase of the amount fuel due to the execution of the removal process is performed immediately after it is determined that there is a removal requirement in the removal requirement determining process. The removal process of the second embodiment will now be described, focusing on differences from the first embodiment.

Figure 9:
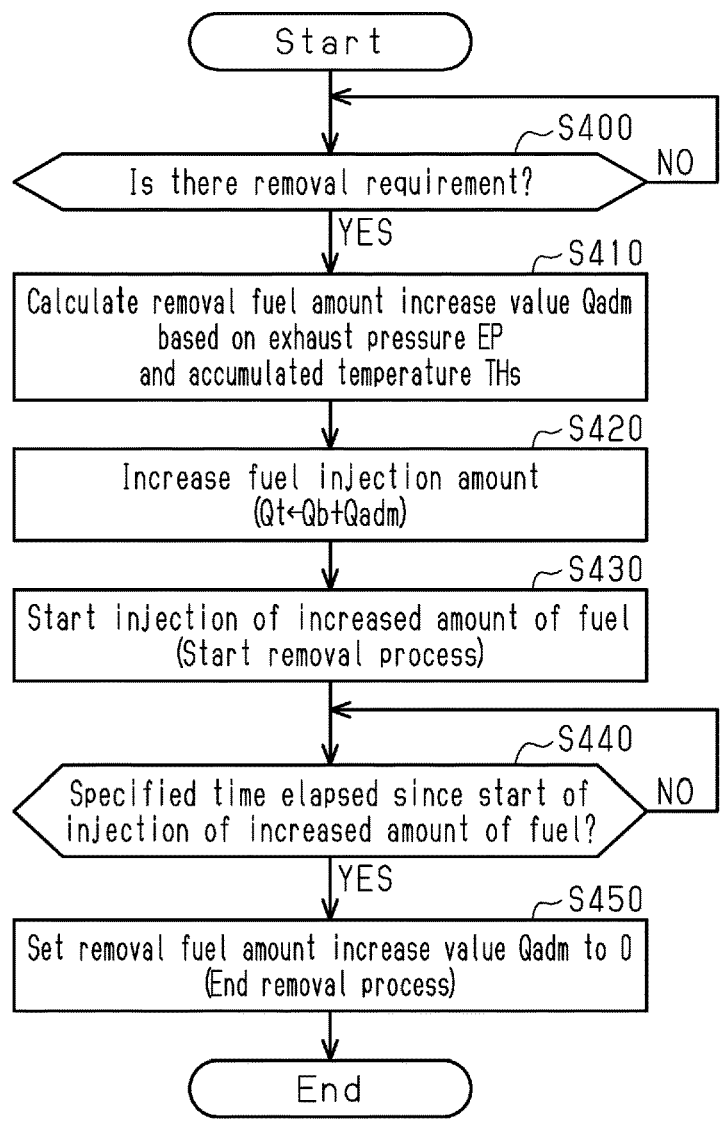
FIG. 9 is a flowchart showing a removal process according to a second embodiment.

FIG. 9 shows the procedure of the removal process of the second embodiment. The series of processes shown in FIG. 9 is also implemented by the CPU 110 executing programs stored in the memory 120 of the controller 100 during the engine operation.

When this process is started, the CPU 110 determines whether there is currently a removal requirement (S400). If it is determined that there is no removal requirement (S400: NO), the CPU 110 repeatedly executes the process of S400 until it is determined that there is a removal requirement.

If it is determined that there is a removal requirement (S400: YES), the CPU 110 calculates a removal fuel amount increase value Qadm, which is an increase amount of fuel required to remove manganese oxide from the catalyst 17, based on the current exhaust pressure EP and the accumulated temperature THs (S410). The calculation of the removal fuel amount increase value Qadm in S410 is the same as the calculation of the removal fuel amount increase value Qadm in S320 shown in FIG. 7.

Next, the CPU 110 sets the target fuel injection amount Qt to a value obtained by adding the removal fuel amount increase value Qadm to the basic injection amount Qb, thereby increasing the fuel injection amount (S420).

The CPU 110 performs the fuel amount increase control by controlling the fuel injection valve 11 such that an amount of fuel corresponding to the target fuel injection amount Qt is injected, thereby starting injection of an increased amount of fuel (S430). The execution of the process of S430 starts the removal process through the execution of the fuel amount increase control.

Next, the CPU 110 determines whether a specified time has elapsed since the start of the injection of the increased amount of fuel (S440). The determining process in S440 is the same as the determining process in S350 shown in FIG. 7. If it is determined that the specified time has not elapsed (S440: NO), the CPU 110 repeatedly executes the process of S440 until it is determined that the specified time has elapsed.

If it is determined that the specified time has elapsed (S440: YES), the CPU 110 sets, to 0, the removal increase value Qadm, by which the fuel injection amount has been increased, and ends the removal process (S450). Then, the CPU 110 ends this process.

The second embodiment has the above-described advantages (1) to (5) and (8) to (10).

The embodiments may be modified as follows. The above-described embodiments and the following modifications can be combined as long as the combined modifications remain technically consistent with each other.

If the fuel amount increase control is performed based on a requirement different from the removal requirement before the accumulated temperature THs reaches the determination value B, the accumulated temperature THs is reset to 0. Alternatively, the process of resetting the integrated temperature THs may be omitted by omitting the process of S110 shown in FIG. 5. In this case, the advantages except for advantage (3) are obtained.

The accumulated temperature THs is calculated as a correlation value proportional to the amount of heat received by the catalyst 17 when the catalyst temperature Tsc is higher than or equal to the adhesion temperature Tf. In place of the accumulated temperature THs, accumulated time may be calculated that is obtained by accumulating time during which the catalyst temperature Tsc is higher than or equal to the adhesion temperature Tf.

Figure 10:
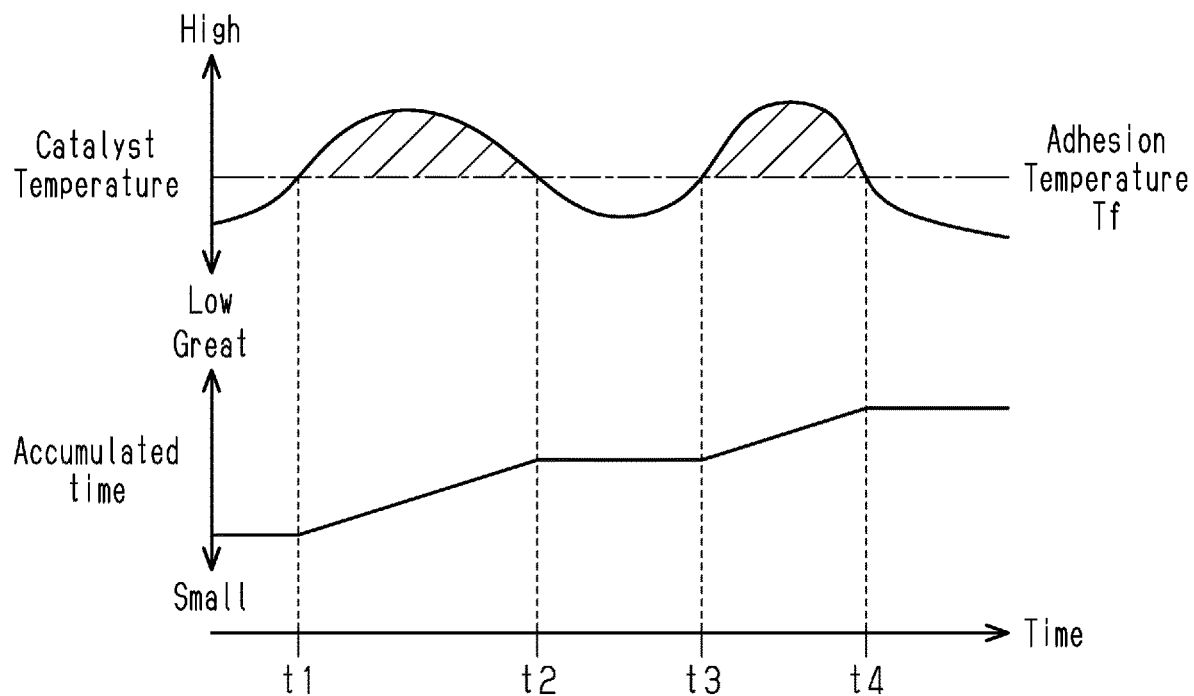
FIG. 10 is a timing diagram showing changes in the temperature of the catalyst and the accumulated time in a modification of the first embodiment.

As shown in FIG. 10, during each of the periods in which the catalyst temperature Tsc is higher than or equal to the adhesion temperature Tf (a period from a point in time t1 to a point in time t2, a period from a point in time t3 to a point time t4), the value of the accumulated time increases in the same manner as the accumulated temperature THs. In contrast, during each of periods in which the catalyst temperature Tsc is lower than the adhesion temperature Tf (a period before the point in time t1, a period from the point in time t2 to the point in time t3, a period after the point in time t4), the value of accumulated time is maintained without being changed in the manner as the accumulated temperature THs.

It is also possible to calculate such an accumulated time as a correlation value and treat the value in the same manner in which the accumulated temperature THs is treated.

The catalyst temperature Tsc correlates with the temperature of exhaust gas flowing in the exhaust passage 15 (particularly, the temperature of exhaust gas flowing in the catalyst 17). Therefore, such an exhaust temperature may be used instead of the catalyst temperature Tsc.

Although the removal fuel amount increase value Qadm is variably set based on the exhaust pressure EP and the accumulated temperature THs, the removal fuel amount increase value Qadm may be variably set based on one of the exhaust pressure EP and the accumulated temperature THs.

In each of the above-illustrated embodiments, the removal fuel amount increase value Qadm is variably set based on the exhaust pressure EP and the accumulated temperature THs, while the specified time, which is the execution time of the removal process, is a fixed value. Alternatively, the removal fuel amount increase value Qadm may be a fixed value, and the specified time may be variably set based on the exhaust pressure EP and the accumulated temperature THs, so that the total amount of fuel to be increased during the removal process is variably set.

Figure 11:
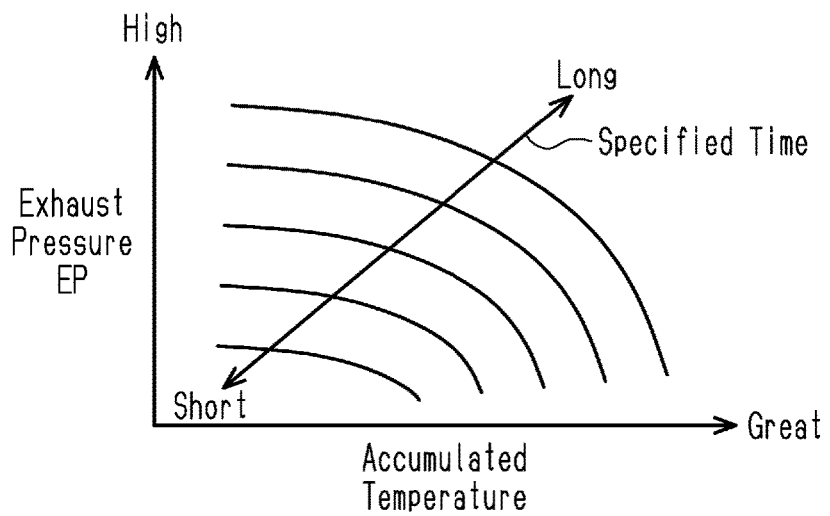
FIG. 11 is a conceptual diagram showing the relationship between a specified time, the accumulated temperature, and the exhaust pressure in a modification of the first embodiment.

As shown in FIG. 11, the specified time may be variably set to be longer as the accumulated temperature THs increases, and may be variably set to be longer as the exhaust pressure EP increases. In this case also, the total amount of fuel supplied to the catalyst 17 during the execution of the removal process is properly adjusted in accordance with the amount of manganese oxide adhering to the catalyst 17. The specified time may be variably set based on one of the exhaust pressure EP and the accumulated temperature THs.

In addition, both of the removal fuel amount increase value Qadm and the specified time may be set variably based on the exhaust pressure EP and the accumulated temperature THs.

The predicted value BP may be calculated based on a value other than the total travel distance.

The fuel amount increase control performed based on a requirement different from the removal requirement may be a fuel amount increase control other than the overtemperature protection control or the acceleration fuel amount increase control.

The controller 100 is not limited to a device that includes the CPU 110 and the memory 120 and executes software processing. For example, a dedicated hardware circuit (such as an ASIC) may be provided that executes at least part of the software processing executed in each of the above-described embodiments. That is, the controller 100 may be modified as long as it has any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An internal combustion engine, comprising:
a fuel injection valve that supplies fuel into a cylinder;
an exhaust gas purifying catalyst provided in an exhaust passage;
a filter for trapping particulate matter in exhaust gas, the filter being provided in a section of the exhaust passage on a downstream side of the catalyst;
a pressure sensor that measures an exhaust pressure between the catalyst and the filter; and
a controller;
wherein the controller includes executable instructions stored in a non-transitory memory to
increase an amount of fuel injected from the fuel injection valve to reach an air-fuel ratio of an air-fuel mixture being richer than a stoichiometric air-fuel ratio;
determine a predicted value of the exhaust pressure while an engine fuel containing no manganese is used continuously;
calculate a correlation value being proportional to an amount of heat received by the catalyst when a temperature of the catalyst is higher than or equal to an adhesion temperature being defined as a minimum temperature of the catalyst at which manganese oxide collected on the catalyst adheres to the catalyst;
determine a removal requirement for removing manganese oxide from the catalyst when a difference between a detected pressure of the pressure sensor and at least one of the predicted value is greater than a specified determination value, and the correlation value is greater than or equal to the specified determination value; and
increase the amount of fuel when the removal requirement has been determined.

2. The internal combustion engine according to claim 1, wherein the controller further includes executable instructions to calculate the predicted value based on a total travel distance of a vehicle on which the internal combustion engine is mounted, with the predicted value becoming a higher pressure value as the total travel distance becomes longer.

3. The internal combustion engine according to claim 1, wherein the controller further includes executable instructions to reset the correlation value to 0 based on a requirement different from the removal requirement before the correlation value becomes greater than or equal to the specified determination value.

4. The internal combustion engine according to claim 1, wherein a value of an increase in the amount of fuel, during execution of the removal requirement becoming greater, is set to be greater as the correlation value.

5. The internal combustion engine according to claim 1, wherein a pressure of an increase in the amount of fuel, during execution of the removal requirement becoming higher, is set to be greater as a detected pressure.

6. The internal combustion engine according to claim 1, wherein the controller further includes executable instructions to
perform an overtemperature protection control to suppress overheat of the catalyst due to an increase in the amount of fuel during execution of the removal requirement.

7. The internal combustion engine according to claim 1, wherein the controller further includes executable instructions to
increase an engine power during acceleration of a vehicle on which the internal combustion engine is mounted, and
increase the amount of fuel by execution of the removal requirement due to the acceleration of the vehicle.

8. A control method for an internal combustion engine, wherein
the internal combustion engine includes
a fuel injection valve that supplies fuel into a cylinder,
an exhaust gas purifying catalyst provided in an exhaust passage,
a filter for trapping particulate matter in exhaust gas, the filter being provided in a section of the exhaust passage on a downstream side of the catalyst, and
a pressure sensor that measures an exhaust pressure between the catalyst and the filter, wherein
the internal combustion engine is controlled to perform a fuel amount increase control to increase an amount of fuel injected from the fuel injection valve such that an air-fuel ratio of an air-fuel mixture becomes richer than a stoichiometric air-fuel ratio, and
the control method comprises:
by a controller,
calculating a predicted value of the exhaust pressure for a case in which engine fuel containing no manganese is used continuously;
determining an adhesion temperature, which is a minimum temperature of the catalyst at which manganese oxide collected on the catalyst adheres to the catalyst, and calculating a correlation value proportional to an amount of heat received by the catalyst when a temperature of the catalyst is higher than or equal to the adhesion temperature;
determining a removal requirement for removing manganese oxide from the catalyst when a difference between a detected pressure of the pressure sensor and at least one of the predicted value is greater than a specified determination value, and the correlation value is greater than or equal to a specified determination value; and
increasing the amount of fuel when the removal requirement has been determined.

* * * * *